Aug. 20, 1935.  C. A. PEARSON  2,011,824
GAS HEATER VALVE
Filed Nov. 26, 1934  2 Sheets-Sheet 1
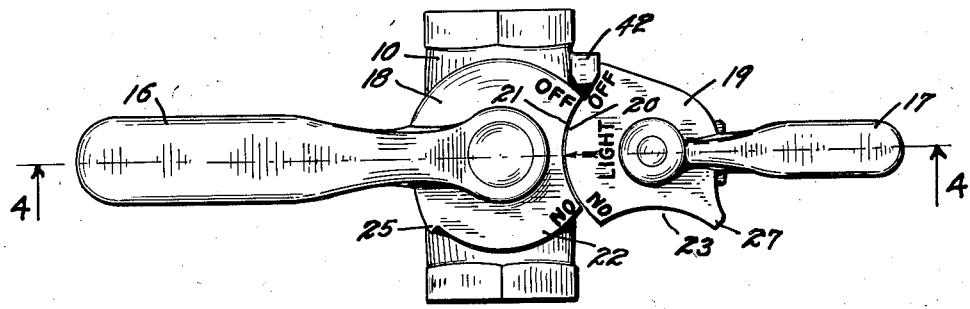
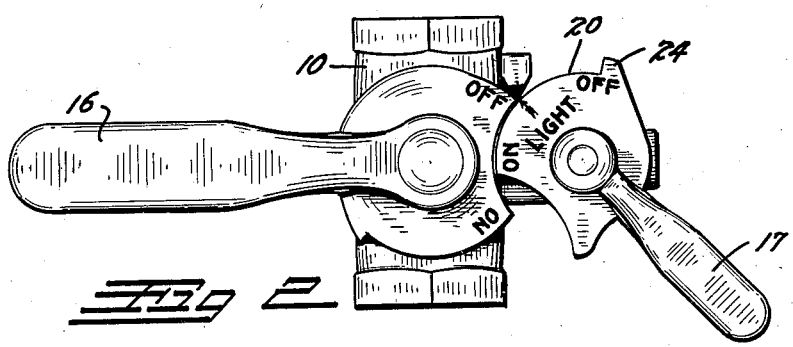
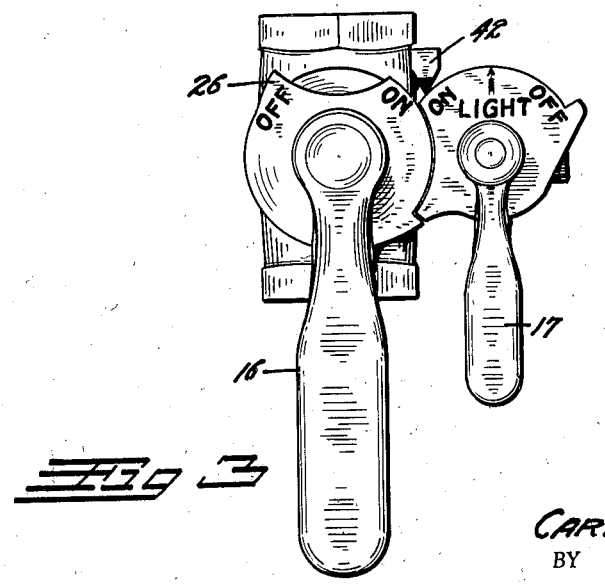
INVENTOR.
CARL A. PEARSON
BY
ATTORNEY.

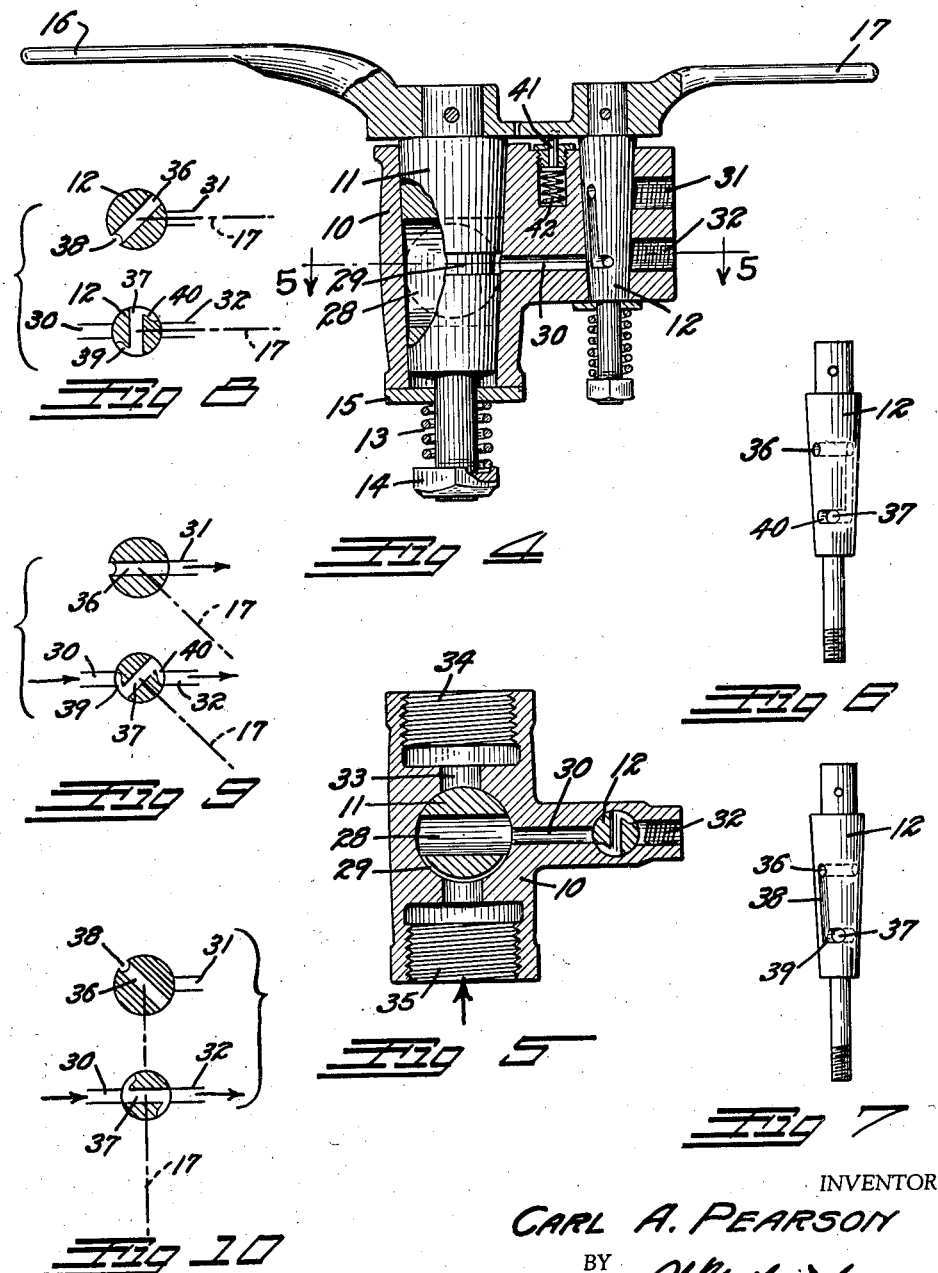

Patented Aug. 20, 1935

2,011,824

UNITED STATES PATENT OFFICE 2,011,824

GAS HEATER VALVE

Carl A. Pearson, Denver, Colo.

Application November 26, 1934, Serial No. 754,735

6 Claims. (Cl. 277—69)

This invention relates to a supply valve for gas heaters. The principal object of the invention is to provide a composite valve for controlling the gas supply to an automatic lighter, a pilot light, and a main burner so that a pre-determined sequence of operations must be carried out in opening or closing the various valves.

Another object of the invention is to so construct the device that the supply to the pilot light cannot be turned on without also turning on the lighter supply, and so that the main burner valve can not be turned on until the pilot supply has been turned on and the lighter supply has been turned off.

Explosions are often caused in gas heating devices by turning the main supply on while the lighter and pilot are off, thereby filling the firebox with combustible gas which is ignited when a light is later introduced. Explosions are also occasioned by accidental shutting off of the main supply when the pilot is not burning, and then again turning on the main supply without a pilot light.

A further object of this invention is to provide a valve in which it will be impossible to turn the main valve on until the pilot is turned on and in which the pilot light cannot be turned off until the main supply has been turned off.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:—

Fig. 1 is a plan view of the improved valve, illustrating it in the completely "off" position.

Fig. 2 is a similar plan view illustrating the valve in the "starting" position.

Fig. 3 is a similar view illustrating the valve in the "operating" position.

Fig. 4 is a vertical cross section through the valve, taken on the line 4—4, Fig. 1.

Fig. 5 is a horizontal section, taken on the line 5—5, Fig. 4.

Figs. 6 and 7 are detail views illustrating the secondary valve plug.

Figs. 8, 9 and 10 are diagrammatic views illustrating the relative positions of the ports in the secondary valve plug when the valve is in the positions of Figs. 1, 2 and 3, respectively.

The invention comprises: a valve body 10 carrying a main valve plug 11 and a secondary valve plug 12. The valve plugs 11 and 12 are preferably of the "plug" type fitted into tapered bores. The valve plugs are maintained snug in their bores by means of compression springs 13 which are compressed between compression nuts 14 in the valves and spring washers 15 against the body.

The main valve plug 11 is provided with a main handle 16. The secondary valve plug 12 is provided with a secondary handle 17. Each of these handles is cast integrally with an interlocking disc, there being an interlocking disc 18 on the handle 16 and interlocking disc 19 on the handle 17.

A portion of the disc 19 is arcuate about the axis of the plug valve 12, as indicated at 20. This arcuate portion fits into an arcuate indentation 21 in the disc 18. A portion of the disc 18 is also arcuate as shown at 22 and the latter arcuate portion fits into a corresponding arcuate indentation 23 in the disc 19. The arcuate portion 20 terminates at one extremity in a stop boss 24. The portion 22 of the disc 18 terminates in a similar stop boss 25. The indentations 21 and 23 are formed with elongated extremities 26 and 27 respectively, which also act as stops to limit the movement of the valve handles.

The body 10 carries a click 41 actuated by a spring 43, which engages a notch in the bottom of the interlocking disc 19 when the secondary handle 17 is in a 45° position. Suitable indications such as "on" "off" and "light" are carried by the interlocking discs and, when opposite a pointer 42, indicate to the operator the position of the primary or secondary valves.

The main valve is formed with a main valve passage 28 extending diametrically therethrough. A by-pass groove 29 extends partially around the main valve 11 between the open extremities of the passage 28. This passage controls the main flow to the burner through a main channel 33 which terminates in threaded couplings 34 and 35 for receiving the main supply conduit. This by-pass groove 29 is positioned opposite a lateral passage 30 in the housing 10 and communicates with the bore of the secondary valve plug 12. The secondary valve plug 12 controls two outlets, a lighter outlet 31 and a pilot outlet 32. The latter outlets are threaded to receive the feed pipes to the lighter and pilot of the burner, respectively.

The secondary plug valve 12 is formed with an upper diametrically extending passage, herein designated the lighter port 36, and with a lower diametrically extending passage, herein designated the pilot port 37. These two passages are positioned at an angle of 45° to each other. One extremity of the lighter port 36 communicates, by means of a downwardly extending groove 38, with a side groove 39 extending to the extremity of the pilot port 37. The opposite extremity of the pilot port 37 is formed with a similar side groove 40 extending oppositely to the side groove 39.

Operation

Let us assume that the valve is in the fully "off" position of Fig. 1. The secondary valve ports are now in the position indicated in Fig. 8, so that no gas can flow from the passage 30 to either of the outlets 31 and 32. It will be noted that when in this position, the main handle 16 can not be turned since the arcuate portion 20 of its interlocking disc 19 is in the depression 21 of the main disc 18. This prevents rotation of the main valve. If it is desired to start the burner, the secondary handle is turned 45°, or until the click 41 engages its notch.

The handles are then in the position of Fig. 2 with the "light" indication opposite the indicating point 42. When in this position, the ports in the secondary plug 12 are in the position indicated in Fig. 9, that is, the lighter port 36 is aligned with the lighter outlet 31 and the side grooves 39 and 40 of the pilot port 37 are communicating with the lateral passage 30 and the pilot outlet 32, respectively. Thus, gas can flow from the groove 29 in the main valve through the by-pass to both the lighter and pilot outlets and cause the lighter to ignite the pilot light. It is desired to call attention to the fact that the main valve handle 16 is still locked and can not be opened.

The operator now turns the secondary handle 17 to the "open" position of Fig. 3. When in this position, the secondary valve ports are in the position diagrammatically indicated in Fig. 10. It will be noted that the lighter port 36 has moved out of alignment with the lighter outlet 31 so that the supply to the lighter is shut off. The pilot port has moved into direct alignment between the passage 30 and the pilot outlet 32 so that gas continues to flow to the lighter. The notch 23 in the disc 19 has aligned with the arcuate portion 22 of the disc 18 so that the latter disc is released and the main handle 16 can be swung to the "on" position of Fig. 3 to open the main passage 28. The plant is now in full operation.

It is desired to call attention to the fact that in the full "on" position the secondary disc 19 is locked against the arcuate portion 22 of the main disc 18 so that the secondary handle cannot be moved. Thus, the lighter cannot be shut off as long as the main burner supply is on. The projecting boss 42 stops the main handle 16 at the fully "off" position and the boss 25 stops it at the fully "on" position by respective contacts with the disc 19. Similarly, the boss 24 and the boss 27 stop the secondary handle at the full "off" and full "on" positions respectively.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. A composite valve comprising: a valve body; a main passage extending therethrough; a main valve plug interposed in said main passage; a secondary valve plug positioned in said body parallel to said main valve plug, there being a lateral passage in said body between said main and secondary plugs; a lighter outlet; a pilot outlet, said outlets being positioned axially along said secondary plug; and a passage controlled by said secondary plug so that the flow from said lateral passage can be turned into one or both said pilot and lighter outlets.

2. A composite valve comprising: a valve body; a main passage extending therethrough; a main valve plug interposed in said main passage; a secondary valve plug positioned in said body parallel to said main valve plug, there being a lateral passage in said body between said main and secondary plugs; a lighter outlet; a pilot outlet, said outlets extending from said secondary plug; a passage controlled by said secondary plug so that the flow from said lateral passage can be turned into one or both said pilot and lighter outlets; and a groove formed about said main plug communicating with said lateral passage so that said main plug will not control the flow to said lateral passage.

3. A composite valve comprising: a valve body; a main passage extending therethrough; a main valve plug interposed in said main passage; a secondary valve plug positioned in said body parallel to said main valve plug, there being a lateral passage in said body between said main and secondary plugs; a lighter outlet; a pilot outlet, said outlets extending from said secondary plug; valve ports formed through said secondary plug opposite said lighter and pilot outlets, said ports being positioned substantially at 45° from each other; and a passage communicating between said valve ports so that a 45° movement of said secondary plug will open one or both said pilot and lighter outlets.

4. A composite valve comprising: a valve body; a main passage extending therethrough; a main valve plug interposed in said main passage; a secondary valve plug positioned in said body parallel to said main valve plug, there being a lateral passage in said body between said main and secondary plugs; a lighter outlet; a pilot outlet, said outlets extending from said secondary plug; valve ports formed through said secondary plug opposite said lighter and pilot outlets, said ports being positioned substantially at 45° from each other; there being a groove formed in said secondary plug between said valve ports and side grooves extending from one of said valve ports in said plug so that the latter will remain open during substantially a 45° angle so that a first 45° movement of said secondary plug will open both said lighter and pilot outlets; and a second 45° movement will close said lighter outlet and allow said pilot outlet to remain open.

5. A composite valve comprising: a valve body; a main passage extending therethrough; a main valve plug interposed in said main passage; a secondary valve plug positioned in said body parallel to said main valve plug, there being a lateral passage in said body between said main and secondary plugs; a lighter outlet; a pilot outlet, said outlets extending from said secondary plug; valve ports formed through said secondary plug opposite said lighter and pilot outlets, said ports being positioned substantially at 45° from each other;

a passage communicating between said valve ports so that a 45° movement of said secondary plug will open one or both said pilot and lighter outlets; and means for indicating to an operator, the termination of a 45° movement of said secondary valve plug.

6. A composite valve comprising: a valve body; a main passage extending therethrough; a main valve plug interposed in said main passage; a secondary valve plug positioned in said body parallel to said main valve plug, there being a lateral passage in said body between said main and secondary plugs; a lighter outlet; a pilot outlet, said outlets extending from said secondary plug; a passage controlled by said secondary plug so that the flow from said lateral passage can be turned into one or both said pilot and lighter outlets; and a groove extending about one side of said main valve plug, said groove being in constant communication with said lateral passage.

CARL A. PEARSON.